United States Patent

Sanders et al.

[15] 3,665,405

[45] May 23, 1972

[54] MULTIPLEXER

[72] Inventors: Ray W. Sanders, Los Angeles; Neil T. Keyes, Palos Verdes; William Quan, Los Angeles, all of Calif.

[73] Assignee: Computer Transmission Corporation, Los Angeles, Calif.

[22] Filed: Mar. 17, 1970

[21] Appl. No.: 20,283

[52] U.S. Cl. ........................................ 340/172.5
[51] Int. Cl. ........................................ G06f 5/06
[58] Field of Search .................. 340/172.5; 235/157; 179/15

[56] References Cited

UNITED STATES PATENTS

| | | | |
|---|---|---|---|
| 3,571,806 | 3/1971 | Makie et al. | 340/172.5 |
| 3,453,601 | 7/1969 | Bogert et al. | 340/172.5 |
| 3,496,536 | 2/1970 | Wheeler et al. | 340/172.5 |
| 3,497,627 | 2/1970 | Blasbalg et al. | 340/172.5 |

*Primary Examiner*—Paul J. Henon
*Assistant Examiner*—Mark Edward Nusbaum
*Attorney*—John E. Wagner

[57] ABSTRACT

This invention involves a time division multiplex system designed particularly for use with data communication systems. The disclosure discloses a variety of interconnection systems by which a number of different data rate sources or utilization devices may be connected into a common transmission channel. It employs a number of data terminal transmission adapters which adjust the rate, compensate for delays and combine and interleave data in the manner which allows its ready separation and utilization at the opposite end of the transmission medium. The system employs a single master clock for the entire system. Disclosed is a variable data rate combiner which allows the combining of data rates related by the ratio of any two integers, thereby allowing great flexibility in system application.

10 Claims, 14 Drawing Figures

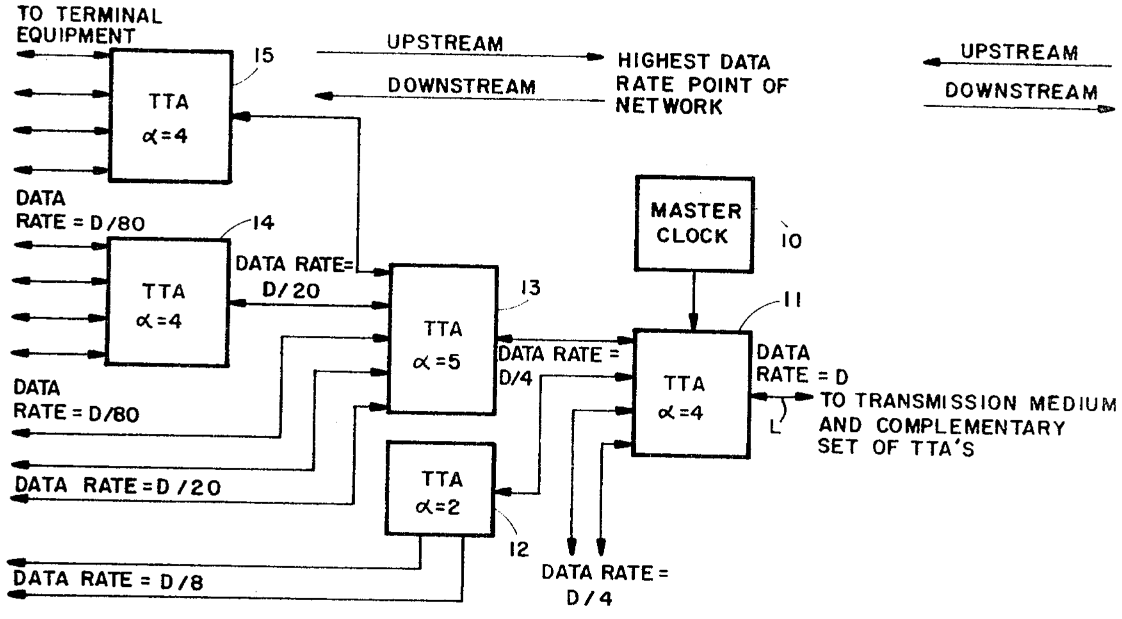

FIG. 1

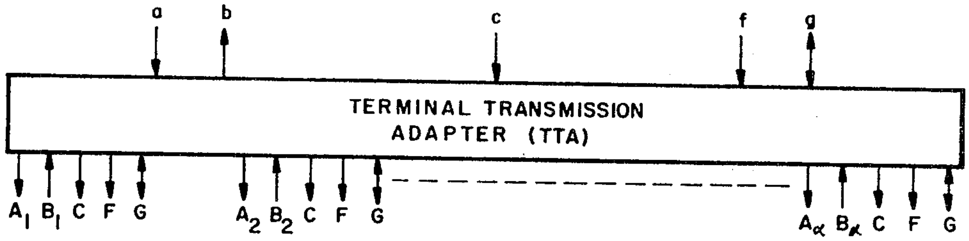

FIG. 2 a = INPUT DATA (MULTIPLEXED HIGH DATA RATE)
b = OUTPUT DATA (MULTIPLEXED HIGH DATA RATE)
c = CLOCK (MULTIPLEXED HIGH DATA RATE)
f = INPUT FRAME (MULTIPLEXED HIGH DATA RATE)
g = OUTPUT FRAME (MULTIPLEXED HIGH DATA RATE)
$A_1$ = OUTPUT DATA (DEMULTIPLEXED LOW DATA RATE)
$B_1$ = INPUT DATA (DEMULTIPLEXED LOW DATA RATE)
C = CLOCK (DEMULTIPLEXED LOW DATA RATE)
F = OUTPUT FRAME (DEMULTIPLEXED LOW DATA RATE)
G = INPUT FRAME (DEMULTIPLEXED LOW DATA RATE)

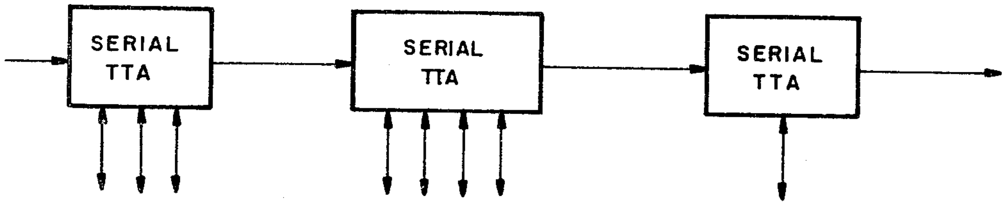

FIG. 6

INVENTORS
RAY W. SANDERS
NEIL T. KEYES
WILLIAM QUAN
BY
John E. Wagner

*Numbers refer to bit positions in frame (of length "n")

INVENTORS
RAY W. SANDERS
NEIL T. KEYES
WILLIAM QUAN

BY

John E. Wagner

γ* = VALUE OF DELAY BETWEEN F & G (UPSTREAM TTA)

δ = PHYSICAL PROPAGATION DELAY

Δ = COMPENSATED PHYSICAL PROPAGATION DELAY (TWO-WAY)

γ = VALUE OF DELAY BETWEEN f and g (DOWNSTREAM TTA)

INVENTORS
RAY W. SANDERS
NEIL T. KEYES
WILLIAM QUAN

BY John E. Wagner

INVENTORS
RAY W. SANDERS
NEIL F. KEYES
WILLIAM QUAN

BY John E. Wagner

INVENTORS
RAY W. SANDERS
NEIL T. KEYES
WILLIAM QUAN
BY
John E. Wagner

*INVENTORS*
RAY W. SANDERS
NEIL F. KEYES
WILLIAM QUAN

BY John E. Wagner

MULTIPLEXER

BACKGROUND OF THIS INVENTION

For many years, there have been in existence time division multiplex systems designed to interlace data from a number of sources and transmit them over a common, single channel in order to achieve greater efficiency in information transmission. Such systems are used primarily to reduce the cost of transmission channels which can often outweigh the cost of terminal equipments. In communication systems, however, there is often a need for greater flexiblity in the system as far as speed and interconnection capability than has been achievable with multiplexing systems. For example, in a typical installation, a number of remote job entry terminals, teletypewriters and cathode ray tube terminals, and business machines are required to be connected to a central computer or to other remote equipments. The ability of the communication system to accept the variety of such sources and to connect all the sources in either serial, loop or tree configuration, and to combine and separate the data according to predetermined address instructions contained in the data is of prime importance.

Typical full-duplex multiplex systems employ at least two master clocks, one at each terminal or end of the main transmission channel, and send synchronizing signals to attempt to maintain remote clocks in real time synchronization. This clocking approach severely limits the interconnection flexibility of multiplex systems. The principal method of overcoming these difficulties in the past has been through use of so-called "bit-stuffing" techniques, an approach which is not necessary with the present invention.

BRIEF STATEMENT OF THE INVENTION

We have devised a time division multiplex data transmission system which overcomes all of the foregoing difficulties of the prior art and is readily adaptable to changes of data rates, transmission delays and since it employs a single master clock, synchronizing problems associated with multiple clocks are eliminated in their entirety.

The heart of the multiplex system of this invention is an assembly known as a terminal transmission adapter (TTA) which serves to combine a number of data sources arriving at its input terminals at one data rate into an increased data rate stream suitable for transmission over the selected transmission medium. The same device can separate incoming data from a high speed channel into a number of channels feeding separate utilization devices. The desired data rates may be selected and changed at will to accommodate different system requirements.

Two different TTA configurations are used in accordance with this invention, one designed for use in a serial or loop systems and one for tree configuration systems. The terminal transmission adapters for tree configuration systems include basically a timing generator which accepts high speed clock and frame pulses and by selection of a data rate conversion factor (alpha) produces a clock and frame pulses at the required low speed rate. The TTA also includes an encoder which receives outgoing low rate data, introduces the required delay for proper time slot multiplexing and combines the data into the high rate of the transmission channel. The TTA also contains a decoder which performs the inverse operation.

The terminal transmission adapters for use in serial or loop systems employs basically the same operational elements but arranged to allow the through transmission of data as well as data combining and data selection.

The terminal transmission adapters also include controllable delay equalizers capable of being adjusted for system normal transmission delay as well as TTA processing delay.

In accordance with another feature of this invention, provision is made for a variable delay compensator and circuitry whereby framing pulses accompanying transmitted data are tracked and the variations in propagation delay detected and automatically corrected.

One other feature of this invention is a data rate combiner which is capable of combining (or separating) the rate of two incoming streams of data by an amount equal to the ratio of any two integers. In the preferred embodiment, it employs a memory module with write and read address counters and clocking circuitry which generates two clock signals at each of the two low speed data rates phase locked to the single high speed data rate.

The system is adaptable to virtually any mode of a transmission system from a simple twisted pair of conductors to public utility data communications systems, optical microwave or other systems.

Another advantage of this invention resides in the fact that it does not involve any significant buffer storage whereby there are virtually no delays in the transmission of data through the system except for those inherent in the transmission medium and the necessary data processing time in the modulation and demodulation steps.

BRIEF DESCRIPTION OF THE DRAWINGS

The foregoing features of this invention may be more clearly understood from the following detailed description and by reference to the drawings in which:

FIG. 1 is a block diagram of a typical tree configuration installation of a time division multiplexed system in accordance with this invention;

FIG. 2 is a representation of the input and output signals of a terminal transmission adapter of FIG. 1 with the symbology explained;

FIG. 6 is a simplified representation of a serial configuration system;

DETAILED DESCRIPTION OF THE INVENTION

Figure 3:
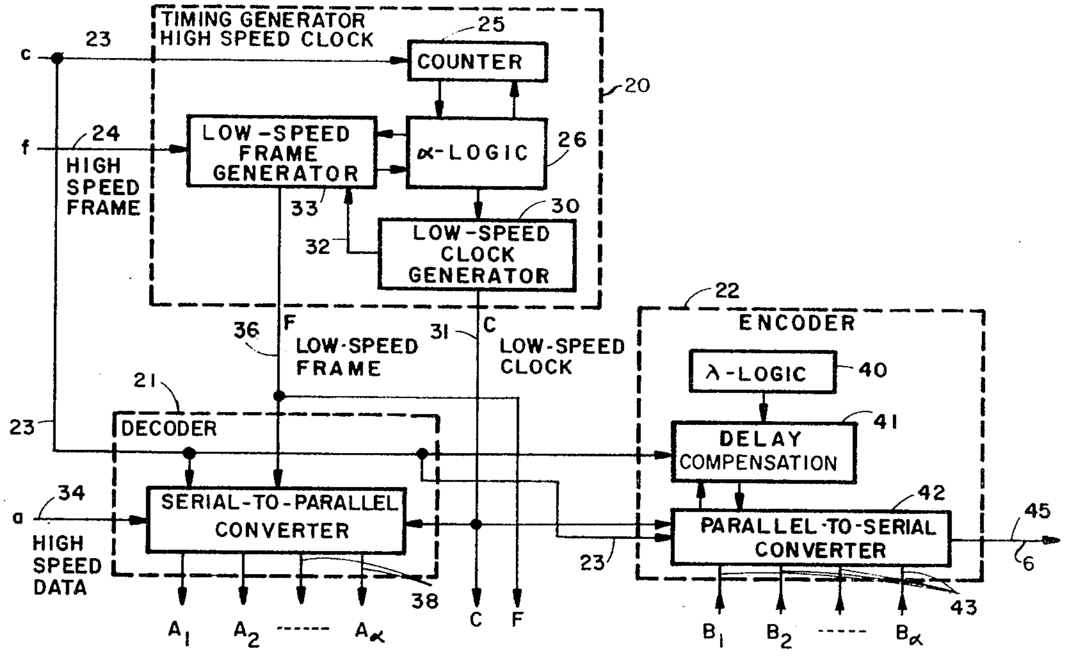
FIG. 3 is a block diagram of a tree configuration Terminal Transmission Adapter TTA.

Now refer to FIG. 1 showing a typical multiplexing and data distribution system in accordance with this invention. It employs a single master clock 10 which establishes the timing reference for the entire system one half of which is represented in FIG. 1. The clock 10 provides timing pulses which are fed to the first Terminal Transmission Adapter 11, (hereafter referred to for convenience as TTA) and from there into the transmission channel represented by line L via TTA 11 to the remaining parts of the terminal system including four additional TTAs, 12–15. Each of the TTAs connected in tree configuration are therefore identical in their circuitry with the exception that each may have a different rate change factor ($\alpha$) which is identified in the drawing. For example, TTA 11 has an ($\alpha$) of 4 whereby any data arriving from data sources associated to the left in the drawing is multiplied by the factor 4. Given the arrangement shown in FIG. 1, 15 different data sources may have access to the transmission system and operate at their normal rate but, after passing through the connected TTAs reach, the transmission line at the transmission channel operating rate. It is recognized that virtually any number of TTAs may be cascaded and the $\alpha$ of each TTA may be adjusted to provide broad system flexibility.

At the opposite end of line L, a central computer or a similar distribution network will normally be found and in a full duplex system data may be transmitted in both directions simultaneously. The flexibility of this system to adapt to simplex, half-duplex, and full duplex and to different data sources or sinks constitutes another advantage of the subject invention.

FIG. 2 illustrates diagrammatically the functional signals which are associated with a single Terminal Transmission Adapter. Not all of the signals shown will be necessary in every embodiment of the invention. Small letters in the Figure are used to denote high data rate side signals of the TTA, while capital letters are used to designate low data rate side signals. For full duplex operation, both $a$ and $b$ signals will be present. For unidirectional operation, only $a$ or $b$ alone will be present, depending upon the direction of transmission. The clock signal $c$ is present in every embodiment and is derived in some manner from a master clock source such as from the master clock directly or from another TTA. The method of determining the time slot address of a particular sample associated with one of the low data rate side terminal connections is referenced to the two framing pulses $f$ and $g$ which are propagated either physically or implicity through the network. For example, suppose that a particular TTA multiplexes and de-multiplexes on an $\alpha = 5$ basis, where $\alpha$ is the ratio of the information rates on the high data rate side to the low data rate side of the TTA. The high data rate side frame pulse $f$ must then occur once each five clock pulses or an integer multiple of five pulses, in order to provide address reference for the TTA. The framing pulse $g$ associated with the output high data rate information stream $b$ will occur with the same period as $f$. However, as will become apparent, the time of occurrence of $f$ and $g$ will be displaced by an amount dependent upon the specific network configuration and the physical transmission delays through the network. The method of treating these delays and configurations is a unique aspect of the invention.

Figure 4:
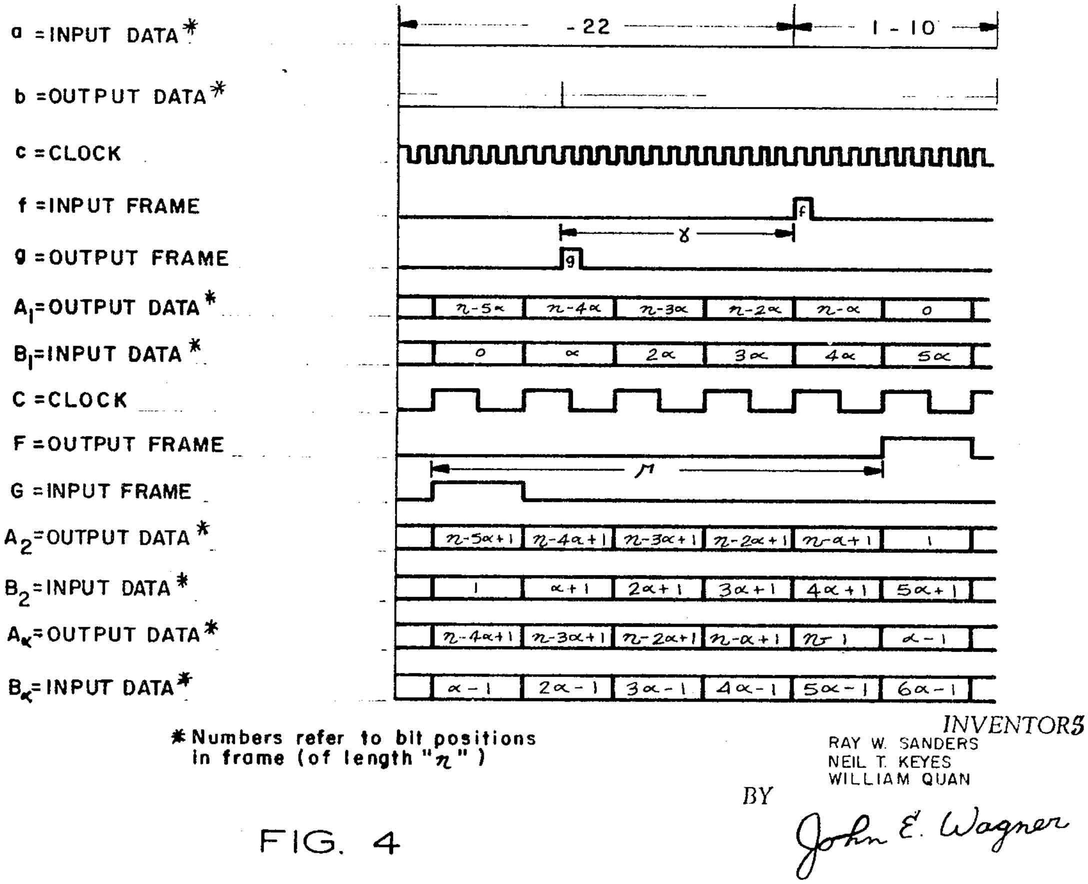
FIG. 4 is a timing diagram representing signals in a typical Terminal Transmission Adapter TTA.

On the low data rate side of the TTA, each output data line $A_i$ contains a sample of the incoming $a$ multiplex stream each $\alpha$ clock times. Thus, if $\alpha = 5$, each fifth information sample of one particular phase appearing on $a$ will appear on output line $A_i$. The synchronization of this de-multiplexing process is controlled by the frame pulse $f$. Likewise, low data rate inputs $B_i$ are sampled once each $\alpha$ clock times and placed in series on line $b$. The sampling process which is determined by the framing pulse $g$ or, in the preferred embodiment, by a suitable time delay arrangement related to the framing pulse $f$. This arrangement is described in detail below. The output clock signal C is derived from the input clock signal $c$ and has a period which is $\alpha$ times the period of $c$. In the preferred embodiment, the positive going edge of the C clock signal is time-aligned with the positive going edge of the input frame pulse $f$, which itself is time-aligned with the positive going edge of the clock signal $c$. These and other timing factors are illustrated in FIG. 4. The output clock signal C is common to all low data rate side terminal connections. Clock signals throughout the network are assumed to be aligned according to conventional practice so that data transitions can occur only at positive going transition times of clock signals. Data are assumed always to be sampled at the negative going transition times of the clock signals. The output framing pulse F is derived from the input framing pulse $f$ and appropriate timing circuitry. In the preferred embodiment, the leading edge of the output frame pulse F occurs at the positive going transition of the output clock signal C following the input framing pulse $f$. The input framing pulse G on the low data rate side is not generated in the preferred embodiment of the invention. Its position must be implicitly determined, however, in order to properly program TTAs within the network. If it were generated (as will be the case in certain embodiments of the invention), it would occur at a position preceding the high data rate side output framing pulse $g$ by from one-half to $\alpha$ $c$ clock times. The exact number depends upon the required delay necessary to have the G framing pulse time-aligned with a C positive going clock pulse transition, and the required number of $c$ clock pulses separating the $f$ and $g$ framing pulses. This number of clock pulses, $f$–$g$, is denoted as $\gamma$. From the rules stated above for the generation of F and G pulses, it is clear that the number of output C clock pulses $\Gamma$ is dependent solely on $\gamma$ and the countdown ratio $\alpha$. Thus, for a cascaded network of TTAs, $\Gamma$ on the low data rate side of one TTA becomes $\gamma$ for the high data rate side of a succeeding TTA (assuming the propagation delay between TTAs is negligible).

In FIG. 4, each time slot for the high data rate input and output information streams $a$ and $b$ are numbered, starting with zero and running through $n - 1$, where $n$ is the number of samples in a total high data rate frame. Thus, $n$, as mentioned before, must be an integral multiple of $\alpha$. Time slot 0 is, for purposes of explanation, time-aligned with the frame pulse $f$ for the input data stream $a$ and time slot 0 is time-aligned with the (implied) output frame pulse $g$ of the output data stream $b$. The number of C clock pulses N in a frame period for each of the $\alpha$ low data rate information streams is thus equal to $n/\alpha$.

In FIG. 4, the input and output data $a$ and $b$ are represented only by number designation since it typically constitutes a complex waveform such as a PCM code having meaning with respect to this invention only insofar as its time position is concerned. The uniform clock pulses are shown at the system high rate and a single input frame pulse appears following after a delay $\gamma$ the frame pulse $g$ which may actually appear or may be implied. The number of clock pulses $\gamma$ representing the delay between the $f$ and $g$ pulses becomes significant in connection with the discussion of delay equalization below.

The position of output data A1 and input data B1 to the TTA are represented in the timing diagram and the numbers in each frame designate the time slot position within the frame. The output frame pulse F and low speed input frame pulse G are shown stretched in length by the factor $\alpha$ and separated now by a delay $\Gamma$. As indicated above, the reduced rate clock pulse C and frame pulses F and G may be used as the corresponding input pulses $c$, $f$ and $g$ to a succeeding TTA and the process repeated as illustrated for example in FIG. 1 by TTAs 13 and 14.

The actual circuit configuration making up a tree type TTA is illustrated in FIG. 3. It includes a timing generator 20, a decoder 21 and an encoder 22 with the timing generator 20 functioning to generate low speed clock and frame pulses from the high speed inputs $c$ and $f$ over respective leads 23 and 24. Clock pulses over lead 23 are applied to a shift register or other form of counter 25 having, for example, four stages. The readout of the counter and consequently the countdown is determined by a number of switches designed as the $\alpha$-logic 26. By selection of the desired switch positions, the $\alpha$-logic 26 produces one pulse for each 2, 3, 4 . . . or 16 clock pulses to a flip-flop circuit designated as low speed clock generator 30. The logic 26 since it serves to produce a sub-multiple of the input clock pulses is in its simplest sense the selector switches on a divider counter such as counter 25. The low speed pulses from generator 30 are applied over lead 31 to the decoder 21 and encoder 22, and additionally applies the low speed clock pulse over lead 32 to a low speed frame generator 33 constituting a shift register or counter similar to the clock counter 25. The use of these reliable circuits insures accurate reduction of rate of both the clock and frame pulses.

Data from the high speed channel is applied directly to the decoder unit over lead 34 as are clock pulses over lead 23 used as stepping pulses for the decoder counter. Low speed frame pulses over lead 36 to the decoder 21 are used to enable the serial to parallel converter constituting the decoder 21 and low speed clock pulses on lead 31 serve to discharge data from the decoder 21 in parallel over the leads 38 to the required utilization device which may be another cascaded TTA.

The last portion of the TTA, the encoder 22, comprises a series of switches designated $\lambda$ logic 40 to control the length of a shift register for delay compensation 41. Switches merely select the length of shift register in accordance with well-known practice in the art where a shift register is used for delay. The selected delay time measured in clock pulses constitutes the $\lambda$ compensation. The shift register 41 is controlled by clock pulses $c$. Completing the encoder 22 is another shift register 42 designated as a parallel to serial converter connected to the multiple inputs 43 read into the register by the clock pulses C over lead 31. Input to the encoder constitutes a number of leads 43 from a series of low speed data sources designated $B_1, B_2 --- B_\alpha$. The output of the encoder on lead 45 is controlled by clock pulses over lead 23. The outgoing data $b$ at the system high rate is introduced into the transmission medium (or to the next ascending TTA in cascaded circuits).

DELAY EQUALIZATION

The foregoing description of a TTA indicates that appropriate delay compensation is introduced into outgoing data but does not describe the length of the manner in which the delay to be introduced into the system is determined. Delay compensation design considerations are as follows, while referring additionally to FIG. 4:

If, as has been assumed, the low speed input data signals are sampled at the midpoint of the C clock time slots, a delay $\lambda_d$ of from one-half to $\alpha$ $c$-clock times must be mechanized between each sample time and the time of occurrence of the first of the $\alpha$ data samples $B_1, B_2, \ldots, B_\alpha$ within the high rate data stream. The value of $\lambda_d$ required is given by $$\lambda_d=\left(\left[\frac{\alpha-1}{2}\right]-\gamma\right) \bmod \alpha+1/2+1/2\,\{(\alpha-1) \bmod 2\}$$

where $[x]$ denotes the largest integer less than or equal to $x$.

The number of $c$ clock pulses $\lambda$ which occur between the sample time and the leading edge of the $b$ data sample corresponding to $B_1$ is $\lambda=([\alpha-1/2]-\gamma) \bmod \alpha+1$ Thus, after the $\alpha$ data inputs $B_1, B_2, \ldots, B_\alpha$ are sampled, the data input $B_1$ occurs at the leading edge of the $\lambda$th $c$ clock pulse following the low data rate sampling time. The $B_2$ data input occurs in the $b$-data stream at the $(\lambda+1)^{th}$ clock pulse, etc.

The value of $\Gamma$ in terms of $\gamma$ and $\alpha$ is given by $$\Gamma=2+\frac{\gamma+\alpha-\left[\frac{\alpha+1}{2}\right]-\left(\gamma+\alpha-\left[\frac{\alpha+1}{2}\right]\right) \bmod \alpha}{\alpha}$$

From the formulas given, it is possible to program a tree configuration of TTAs so that any desired countdown combination which is physically and mathematically possible can be achieved. To accomplish this programming, a sequential process is followed, starting at the highest data rate portion of the tree network. At that point, a value of $\gamma$ is either given from other equipment considerations or can be chosen arbitrarily. A value of $\alpha$ for the first TTA is determined by the multiplexing plan for the network. From this value of $\alpha$ and the value of $\gamma$ already determined, the value of $\lambda$ is determined. In the preferred embodiment, the values of $\alpha$ and $\lambda$ are set into the TTA by switches in respective logic circuits 26 and 40. The value of $\Gamma$ is determined from the formula given above and is used as the value of $\gamma$ for the next lower level TTAs (if any). The above procedure for determining $\lambda$ and $\Gamma$ is followed successively for each TTA in the network, assuming there are no physical delays involved in the propagation of signals through the network.

Figure 5:
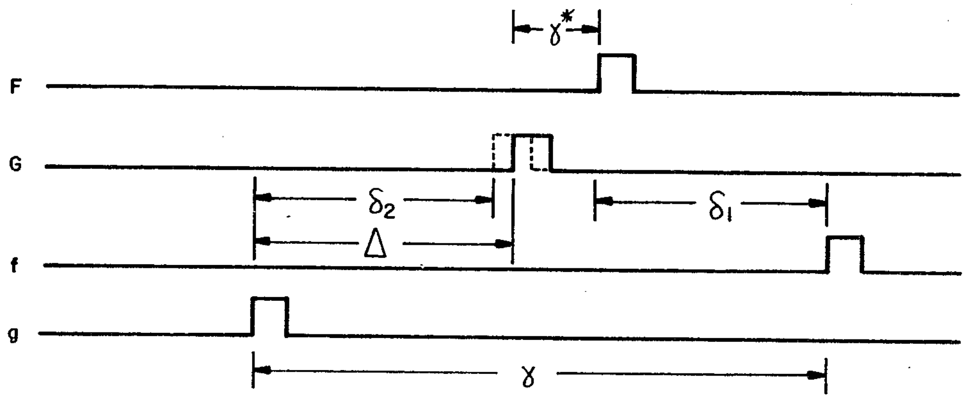
FIG. 5 is a timing diagram representing delay compensation in accordance with this invention.

If fixed physical propagation delays occur between any two points of the network, the same procedure may be followed as outlined above, except that the value of $\gamma$ used must take into account the propagation delay. This situation is illustrated in FIG. 5. If there were no physical propagation delay, the value of $\gamma^*$ which is equal to $\Gamma$ of the upstream TTA (i.e., the TTA nearest the high-data rate point of the network) or to the given or assumed value of $\gamma$ at the highest data rate point of the network, may be used to design the downstream TTA. However, it is clear that with the physical delay, pulse F would arrive at the downstream TTA by a delay interval $\delta_1$. Likewise, if the (implied) frame pulse $g$ were to arrive at the upstream of time (implied) pulse G, it would need be sent at a time $\delta_2$ preceding the (implied) occurrence of G. Since, in the preferred embodiment, the downstream clock circuitry is slaved to the upstream TTAs, it is likely that the arrival time of the (implied) pulse $g$ will not occur exactly in coincidence with the (implied) G pulse. If the physical delay is fixed, the situation can be rectified by inserting a fractional clock time delay line into the return $b$ data line from the downstream TTA to align the $b$-data transition times with the $c$ clock positive going transition times. By this technique, the total delay in the $b$ data stream is $\Delta$ instead of $\delta$. Thus, $\Delta$ is made just long enough to cause $\gamma$ to be an integral number of clock pulses long. The delay compensation is approximated by providing a one-half clock time delay mechanized by a one sample storage buffer or by a sample-and-hold circuit. With these devices, and by using them in conjunction with the complement of the $c$ clock waveform, either no delay or a one-half clock time delay can be inserted into the $b$-data stream. Each $b$ data sample can thereby be sampled at the midpoint of the sample interval with a tolerance of $\pm$ one-fourth-sample interval.

If the propagation time can vary by a significant amount, the propagation delay must be tracked. Referring again to FIG. 5, one method is to provide a variable delay $\Delta$–$\delta_2$ (which can be nominally more than one sample interval in length). The framing pulses, $g$ and G, which in other embodiments are implied, can be physically generated and used as the basis for tracking the delay. In this case, the $g$ pulse may be transmitted to the delay compensator logic 40 and delay compensation, logic 40 and delay equilization shift register 41 of FIG. 3. located at the upstream TTA. The delay is inserted into the $b$ data stream from the downstream TTA (assuming the propagation delays for data and frame pulses are the same or vary by the same amount). Other embodiments are possible where the $g$ and G pulses are not explicitly generated, but where the position of framing pulses is generated by pre-determined patterns in the data stream (such as is the case with certain existing telephone PCM carrier systems).

In the description of the invention, it has been assumed that the clocking pulses and $f$ or F frame pulses are transmitted through the network to form the clocking basis for the network. It is clear that the clocking and framing signals can be derived from the data stream itself and that the roles of the $g$ and G pulses and of the $f$ and F pulses can be interchanged.

SERIAL SYSTEM CONFIGURATION

Figure 7:
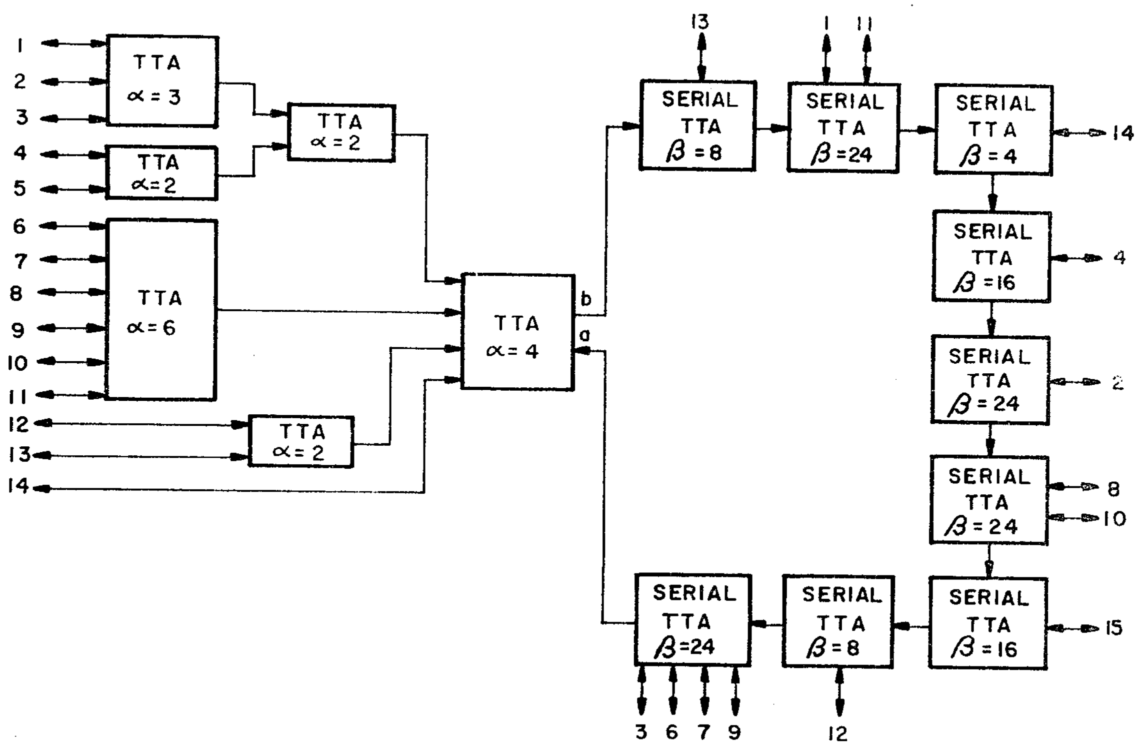
FIG. 7 is a block diagram representation of a combined tree and serial or loop configuration system.

TTAs need not be arranged only in the tree configuration shown in FIG. 1. They can, with some modification, be arranged serially as shown in FIG. 6. The advantage of this configuration is that delay compensation is not required (except at one point in the case where the serial loop is closed on itself). Another advantage obtains from the fact that the direction of information flows is one-way, resulting in much shorter total path lengths (e.g., cable footage) in many network configurations. One method of accomplishing a closed loop serial configuration is shown in FIG. 7, where a set of dedicated channels are mechanized, using a serial network in conjunction with a tree network. This configuration is particularly applicable to computer time-sharing networks. The same configuration could be used to implement an entirely closed loop configuration where any serial part could be programmed to be connected to any other serial part. In this configuration, the inputs and outputs of each part of the tree corresponding to the desired serial parts would be strapped together. The tree TTA parts would thereby provide the necessary delay compensation for the interconnected serial parts. FIG. 7 is but one combined network configuration; as can be seen, an unending variety of combined tree-serial TTA configurations are possible.

Figure 8:
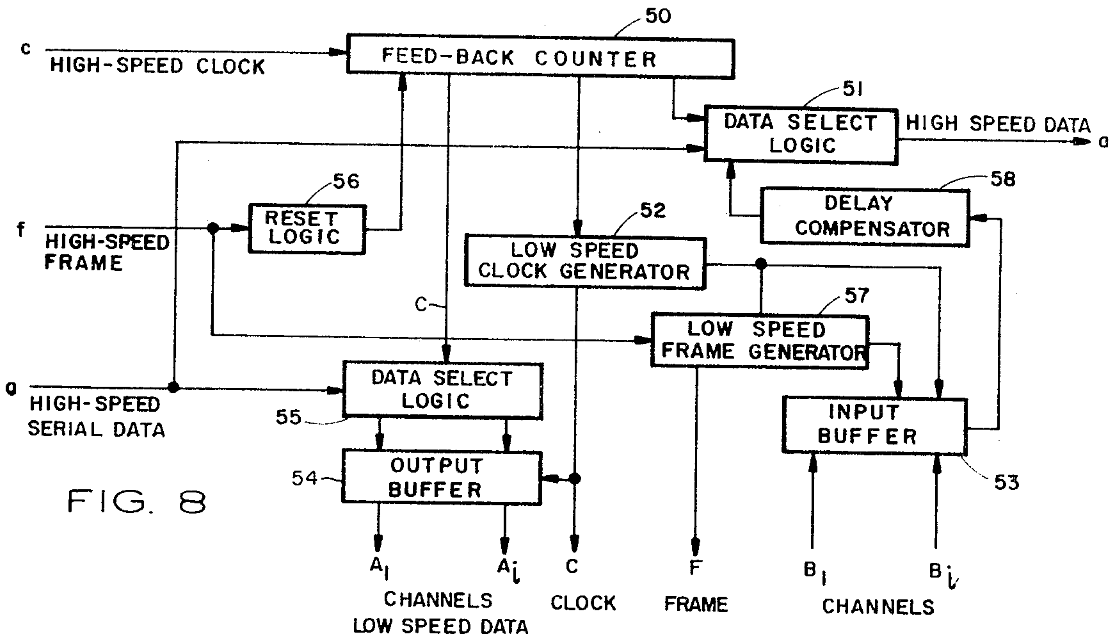
FIG. 8 is a block diagram of a serial system TTA.

FIG. 8 shows a block diagram of a typical Serial TTA. It comprises basically a feedback counter 50 receiving clock pulses $c$ and passing them on through data select logic 51 back to the high speed data line $b$. One stage of the counter 50 is used to provide a divided down pulse data for a low speed clock generator 52 which in turn provides low speed clock pulses C for low speed input and output stages represented by input buffer 53 and output buffer 54 connected to respective input and output channels. A second data select logic circuit 55 serves to control the distribution of high speed incoming data to the output buffer 54. Clocking pulses for the data select logic 55 are supplied from the feedback counter 50. High speed frame pulses $f$ provide timing signals to reset logic circuit 56 which resets the counter 50 for each frame and supplies frame signals to a low speed frame generator 57.

The Serial TTA as shown in FIG. 8 serves to extract, addressed data for low speed channels $A_2$–$A_i$ and from low speed channels $B_1$–$B_i$ and to make the required rate corrections. Any system delay required for properly timed introduction of data into the high speed data stream is introduced by delay compensator 58.

For serial TTAs, the countdown ratio $\beta$ is the ratio of the rate of the high-data rate information streams to the rate of the low-rate streams. In general, a serial TTA does not produce $\beta$ low data-rate channels; it produces a lesser number by selecting one or more of $\beta$ successive information samples following a framing pulse. Each selected sample and samples $K\beta$ $c$-clock times away (where $k$ is an integer) correspond to an information channel.

Figure 9:
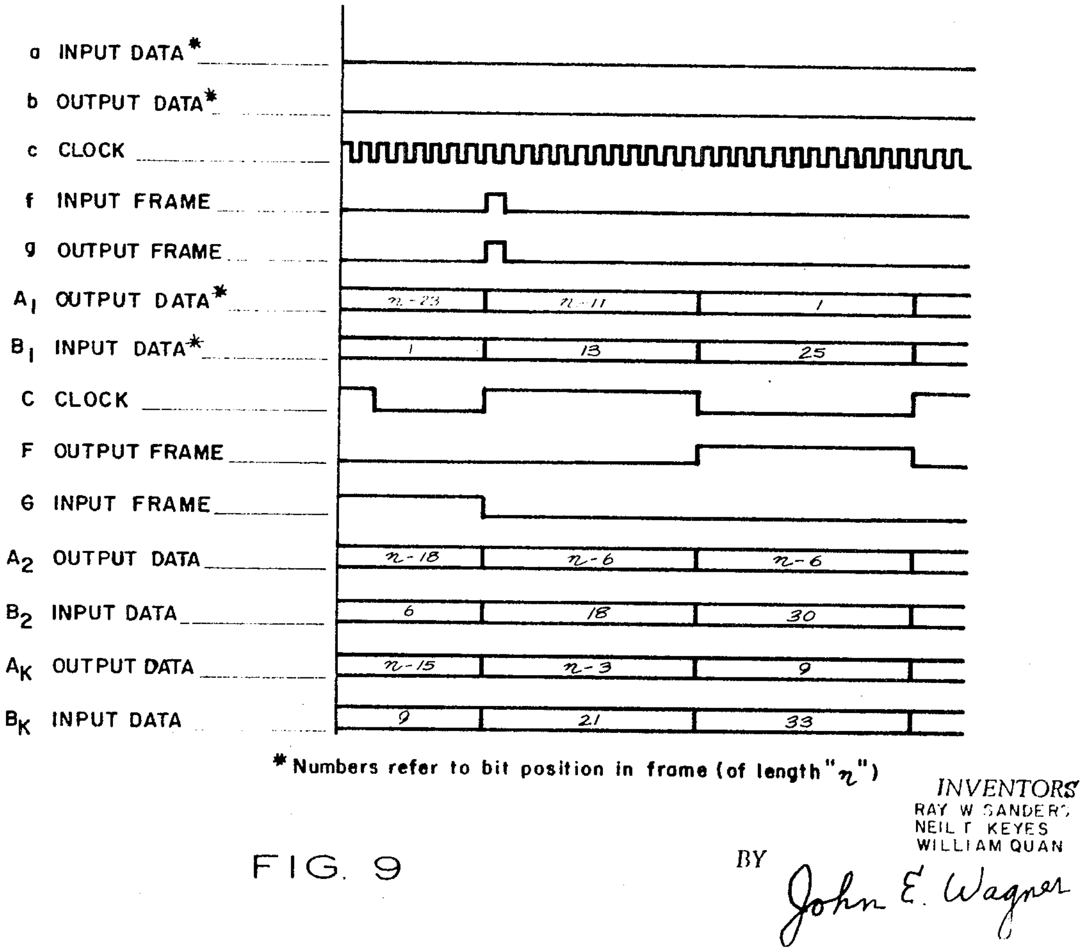
FIG. 9 is a timing diagram of a typical serial system TTA.

As illustrated in FIG. 9, one embodiment of the Serial TTA produces output C clocking pulses, which are submultiples of the $c$ clock rate by a factor of $\beta$ and that the leading edge of the C clock is aligned with the framing pulse. (The number of samples per frame $n$ must be an integer multiple of $\beta$). Within each successive group of $\beta$ data samples in the $a$ data stream, K of them are selected as outputs for the Serial TTA. These K can be assigned any positions within the $\beta$ samples in accordance with the network multiplexing plan. Each of the K positions is assigned to a single Serial TTA output. Each sample is read out of the $a$ data stream during one $c$ clock time into a shift register (for the digital mechanization illustrated in FIG. 8) and transferred to the output buffer during the succeeding C clock period. The $B_i$ input data are sampled at the negative going transition of the C clock and read into the input buffer so that the output $b$ stream contains either a sample of the incoming $a$ stream or a $B_i$ sample. One advantage of time aligning the $a$ and $b$ streams as shown (with $f$ and $g$ pulses time coincident) is that this arrangement allows for a fail-safe mode of operation in which complete regeneration of the $a$ stream into the $b$ stream is not required.

In FIG. 9, it is assumed that each of the $a$ data samples are fed to a single Serial TTA. The sample times corresponding to the channels of one Serial TTA are assumed to be filled by the low data rate input samples of that Serial TTA. It may occur that more than one serial TTA may be required to sample a particular pulse position in the $a$ data stream (party line mode). For this case, a serial TTA can be assigned separate time slots for receive and send data channels.

NON-INTEGER DATA RATE CHANGER

Figure 10:
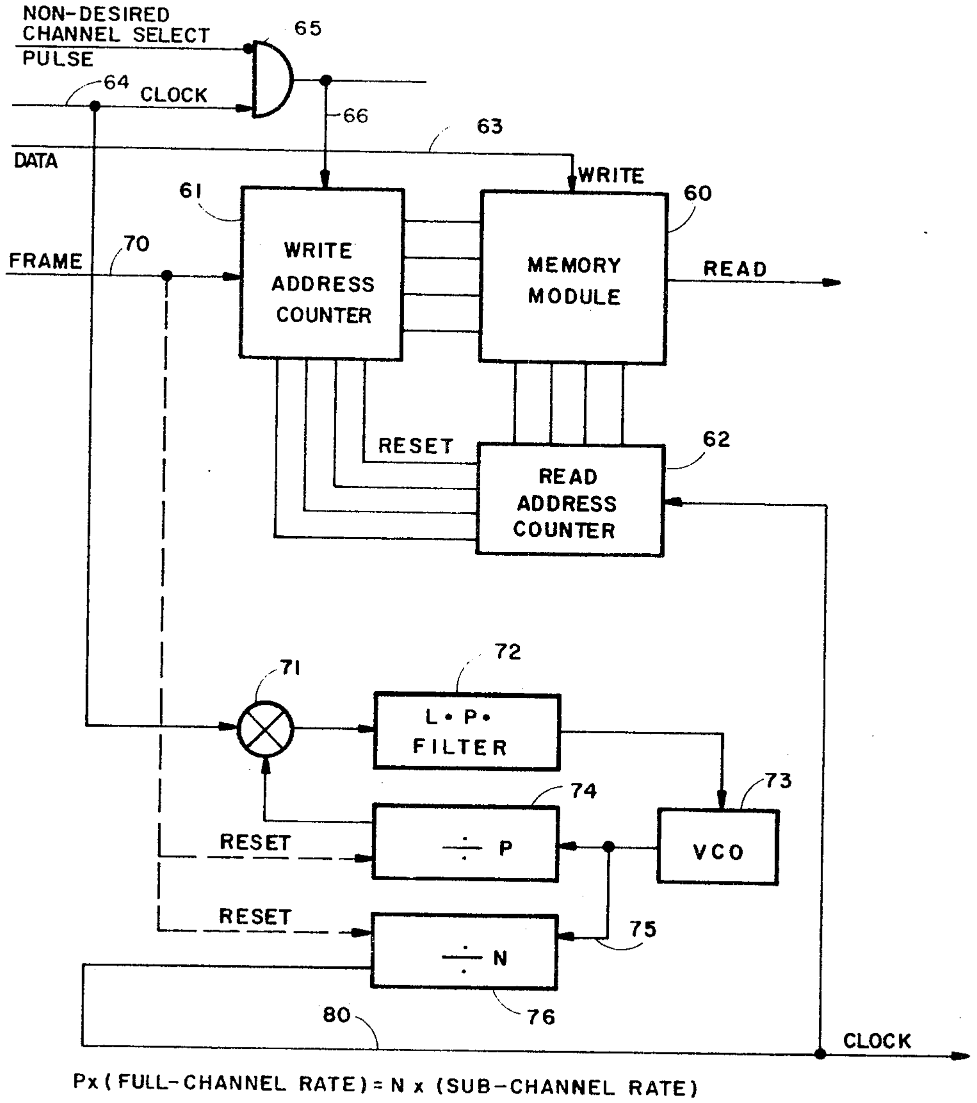
FIG. 10 is a block diagram of the rational integer rate combiner in accordance with this invention.

One of the features of this invention is its adaptability to different data sources and transmission channel rates. In the past, systems have been constrained on rate changes to multiples or submultiple rates using conventional multiplier and divider circuits. The circuit of FIG. 10 illustrates a data rate changer not constrained. The noninteger data rate changer of FIG. 10 includes a conventional memory 60, for example, a shift register capable of storing one frame of data and conventional write address counters 61 and read address counters 62 arranged in conventional order in which serial data is introduced into the memory 60 through lead 63 and stored under control of the write address counter 61. Clock pulses over lead 64 and inhibit gate 65 (when not inhibited) drive the counter 61 over lead 66. Incoming frame pulses on lead 70 are also applied to the write counter 61 to insure that an entire single frame is introduced into the storage portion of the memory module 60.

As described so far, the non-integer data rate changer operates like a conventional data storage device. However, the significant difference is that the read counter 62 is driven by a clock pulse source having a rate which is equal to the incoming clock rate C multiplied by the ratio P/N where P and N are integers selected by the system user. The heart of the data rate changer is a phase locked loop circuit employing a mixer 71, a low pass filter 72 and a local voltage controlled oscillator 73 with its output connected as an input to the mixer 71 through a countdown circuit 74 in conventional manner. The output of the voltage controlled oscillator 73 is introduced into a countdown divider 74 having a multiplication factor P. The phase lock loop causes the voltage controlled oscillator to operate at a frequency of P times the incoming clock rate C. The output from the phase locked loop is taken from the voltage controlled oscillator 73 via lead 75 and a countdown divider 76 having a division factor of N. Therefore the output on lead 80 is a train of pulses having the required rate of P/N times C. The system therefore is not limited in rate changing to multiples or even integers since the factor P/N times C may be a non-integer. The mixer 71, low pass filter 72, voltage control oscillator 73 are all the same components which are traditionally used in phase lock loop circuits as typified by the U.S. Pat. No. 2,318,557 issued to R. W. Sanders, inventor hereof and further shown in U.S. Pat. No. 3,541,449 to D. L. Broderick, et al. Countdown circuit 74 and 76 are conventional dividers.

Figure 11A:
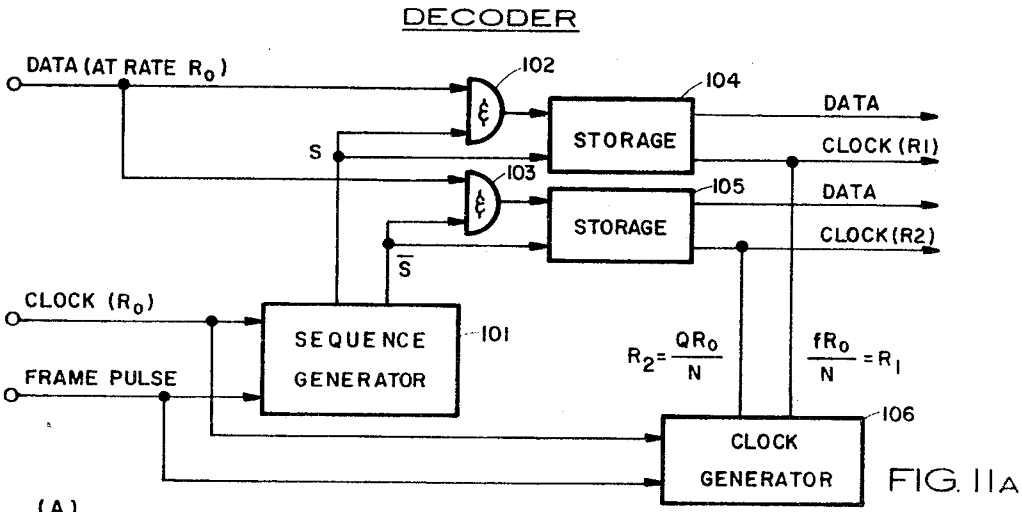
FIGS. 11*a* and 11*b* are block diagrams of a decoder and encoder of this invention.
Figure 11B:
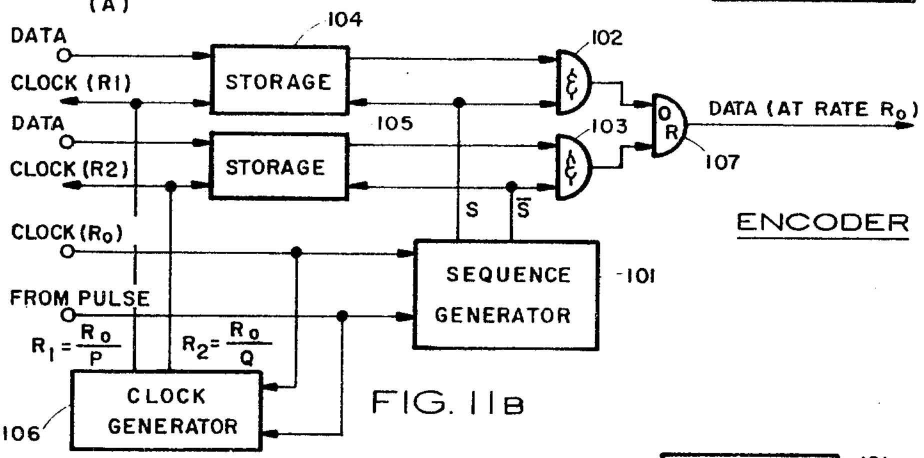

An extension of the concept of the non-integer rate changer of FIG. 10 is shown in additional embodiments of FIGS. 11*a* and 11*b* as a part of the present invention. The FIG. 11*a* shows an incoming high rate data stream being divided into two lower rate streams where the ratio of the rates of the high rate to each of the low rate streams may be any rational number. Denote the input rate by $R_o$, and the output rates by $R_1$ and $R_2$, the ratios are P/N and Q/N where $$R_1 = P/N\, R_o$$
$$R_2 = (Q/N)\, R_o$$

and $$P + Q = N$$

$P$ and $Q$ are integers which are relatively prime. The inverse operation of combining two low rate streams into a single high rate stream is accomplished in the embodiment of FIG. 11*b*.

Now referring to FIG. 11*a* specifically, a decoder may be seen therein which may be used in the system of FIGS. 1, 6 and 7 as a substitute for the data rate changers of FIGS. 3 and 10. As shown in FIG. 11*a*, the non-integer rate divider or decoder 100 comprises basically a sequence generator 101 which is timed by clock pulses and triggered by frame pulses to generate a predetermined sequence code described more fully below. The output of the sequence generator 101 is a pair of complementary signals $s$ and */$s$ which serve as the enabling inputs to a pair of AND gates 102 and 103.

These AND gates 102 and 103 control the parallel input of incoming data at a rate $R_o$ into respective storage elements 104 and 105 from which the two respective low speed channels of data and their low speed clock rates $R_1$ and $R_2$ are discharged. The decoder 100 also includes a clock generator 106 which is synchronized by clock and frame pulses in parallel with the sequence generator 101 to produce two low speed clock rates $R_1$ and $R_2$ as defined above.

The encoder 110 of FIG. 11*b* illustrates the version of the circuit of FIG. 11*a* designed to operate in the reverse manner of combining two or more incoming data channels at rates $R_1$ and $R_2$ into a single train of data at rate $R_o$. It employs the same components or blocks as in FIG. 11*a* and are identified by the same reference numerals for clarity sake. Additionally, the encoder 110 requires an OR gate 107 at the output to allow the combining of the two data streams.

The function of each of the names elements in FIGS. 11*a* and 11*b* is described below prior to describing specific embodiments for the elements.

The function of the Sequence Generator 101 is designed to generate a binary sequence $S$ which is in synchronism with the high rate clock $R_o$ and which output code is pre-determined. The basic function of the sequence generator 101 is, during a sequence of $N$ consecutive $R_o$ clock times, to produce one output state during $P$ of the times and the other state during $Q$ of the times. ($P+Q = N$) In most embodiments, it will be necessary to cause the two low rate stream samples to occur in coincidence with periodic clock signals (at rates $R_1$ and $R_2$). In these instances, it is desirable that the sequence generator 101 output exist in each state in as periodic a manner as possible. This near-periodicity will reduce the amount of storage (i.e., number of samples) required of storage elements 104 and 105.

As an example, consider $P$=3, $Q$=5, and $N$=3+5=8. The following sequences (neglecting cyclic permutations) might be generated by appropriate sequence generator embodiments. (The two states are denoted by 1 and 0. State 0 is assumed to be associated with $P$ for purposes of explanation.

| | $N$=γ |
|---|---|
| (1) | 0001111100011111 |
| (2) | 0011110100111101 |
| (3) | 0010111100101111 |
| (4) | 0011101100111011 |
| (5) | 0011011100110111 |
| (6) | 0111010101110101 |
| (7) | 0110110101101101 |

Of these physically possible sequences, the sequence 1 is the least periodic as far as the two states are concerned and would require the most storage to obtain output periodicity. The sequence 7 is the most nearly periodic and would require the least storage.

The function of the Clock Generator 106 is to derive the two clock signals, operating at rates $R_1$ and $R_2$, from the high speed clock rate $R_o$. (In the preferred embodiment, these clock rates are periodic.) The clock generator 106 outputs also control the state of the buffer storage elements 104 and 105 as well as the establishment of sampling times for both input and output low speed data.

As implied above, the function of storage elements 104 and 105 is to provide time delay buffering between the low-speed input and output data lines and the sampled high-speed lines. The storage buffer is of the "elastic" type where the number of samples stored can very during the N states of the Sequence Generator 101 depending on the relative periodicity of the Sequence Generator outputs and on the relative phases of the high and low speed clock signals.

The "AND" and "OR" functional elements 102, 103 and 107 are standard digital logic elements.

Figures 12, 13:
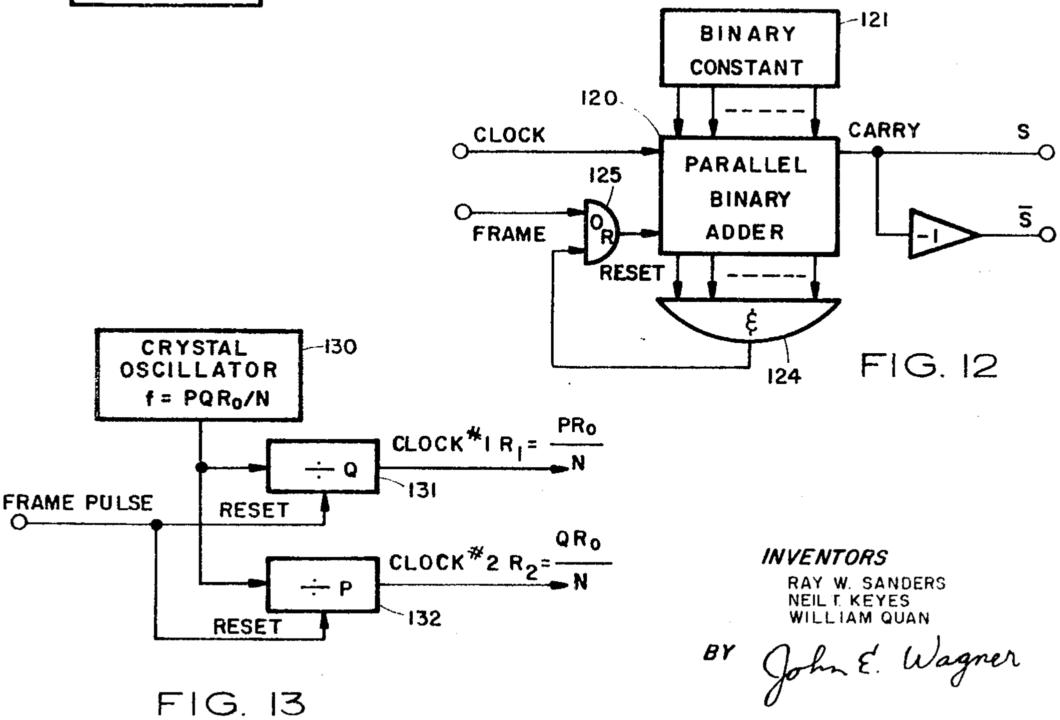
FIG. 12 is a block diagram of the sequence generators of FIGS. 11*a* and 11*b*; and, FIG. 13 is a block diagram of a clock generator.

Shown in FIG. 12 is the preferred embodiment of a Sequence Generator. The heart of the sequence generator is a Parallel Binary Adder 120. The adder 120 is a full adder with carry at each stage where the number of stages is determined by the value of $N$. The output sequence is generated by the carry of the final stage of the adder 120. The Binary Constant Generator 121 provides a pre-programmed input to the adder 120, whose value depends upon $P$&$Q$. An AND gate 124 is connected to each stage of the parallel adder 120 in a manner which will cause the adder, through reset logic, OR gate 125, to be placed in the all-zeroes state once each $N$ clock cycles, operating at the rate of $R_o$. In addition to the reset capability provided by the AND gate 124, a frame pulse generated externally to the Sequence Generator and occurring at a period equal to some integral number of $N$ clock periods, sets the phase of the sequence generator through the same adder reset logic gate 125. The number of stages required in the Parallel Binary Adder 120 is equal to the smallest integer greater than $\text{Log}_2 N$. The binary constant $d$ must be an odd number such that $[d/2^n \cdot N] = P$ or $Q$ where $[x]$ is the integer value of X. The reset constant H which determines the state of the parallel binary adder to be recognized by the AND gate is computed by the formula $h = (d \cdot N) \bmod (2^n)$.

The operation of the Sequence Generator of FIG. 12 can best be understood by following a specific example. Assume $P = 2$ and $Q = 3$ so that $N = 2+3 = 5$. From the above formulas, one finds that the number of stages required in the Parallel Binary Adder 120 is three, since this is the smallest integer greater than or equal to $\text{Log}_2 5$. Furthermore, the value of $d$ must be equal to 5 since $5/2^3 \cdot 5 = 3$, or in form binary $d = 101$. Furthermore, the value of $h$ equal $(5.5) \bmod 8 = 1$, or in binary form, $h = 001$. Starting with the reset of the parallel adder by a frame pulse, the binary states of the adder at each successive clock pulse are given in the following table. The output carry, which is the required sequence generated by the device is shown in a separate column.

| Adder | Output Carry |
|---|---|
| 000 | — |
| 101 | 0 |
| 010 | 1 |
| 111 | 0 |
| 100 | 1 |
| 001 $\xrightarrow{reset}$ 000 | 1 |
| 101 | 0 |
| 010 | 1 |

It is seen that after the initial reset pulse, any five adjacent output carry states contain two zeros and three ones. Thus, the required sequence has been generated where a zero output corresponds to the $P$ rate and the ones correspond to the $Q$ rate. Which of the two states correspond to $P$ is determined by the value of $d$ which satisfies the above formula.

Other embodiments of the Sequence Generator are possible. Some of these include shift register sequence generator embodiments, e.g., based on descriptive material given in Golomb, S., "Digital Communications," embodiments based upon mechanization of counters with cycle periods equal to $P$, $Q$, & $N$ clock times, and so-called rate generator embodiments.

Although the present invention has been described based upon dividing a single high-rate data stream into two low-rate streams, it is clear that sequence generator embodiments are possible where more than a two-state output can be generated. Such embodiment could make use of a variety of higher level alphabet logic devices. The resulting embodiments would produce more than two low-rate data streams for a high-rate stream, each rate of which is related to the high-rate by a rational number.

FIG. 13 shows a block diagram of an embodiment of a clock generator 106 useable in the Sequence Generator. A Crystal Oscillator 130 running at a frequency $PQR_o/N$ feeds two counters 131 and 132, each of which produces a periodic clock signal operating at rates $R_1$ and $R_2$. The frame pulse generated externally to the circuit is used to periodically reset the counters 131 and 132. The frequency stability of the crystal oscillator 130 must be sufficiently great to assure that the jitter of the output clock signals meets the overall system requirements. An alternative embodiment to that shown in FIG. 13 would involve phase-lock loop circuitry to control the crystal oscillator frequency and phase similar to that shown in FIG. 10 for the non-integer rate changer with the addition of a second counter.

I claim:

1. A multiplexer comprising a timing generator responsive to incoming high speed clock and frame signals to produce submultiple clock and frame signals at the required low speed data rate, and an encoder adapted to be connected to a plurality of low speed data sources, said timing generator including counting means driven by said incoming clock pulses for producing low speed clock pulses, switch means connected to said counting means for selecting one of a series of submultiple low speed rates for said counting means, a frame counter connected to the source of high speed frame signals, means driving the frame counter with said low speed clock pulses to produce low speed frame pulses, and said encoder comprising a parallel to serial converter with a plurality of parallel input terminals for said low speed data sources, an input clock terminal and a high speed data output terminal, said encoder also including means for applying low speed clock and frame signals from the timing generator to the parallel to serial converter to define a frame of low speed data, and means for applying high speed clock pulses to the encoder to advance frames of data from the low speed sources to the high speed data output terminals.

2. The combination in accordance with claim 1 wherein said encoder includes controllable delay means between the source of low speed clock and frame signals and the parallel to serial converter whereby outgoing data may be delay time compensated for proper time slot transmission.

3. The combination in accordance with claim 2 including switching logic means for selecting the delay compensation.

4. The combination in accordance with claim 2 wherein said controllable delay means comprises a shift register.

5. The combination in accordance with claim 1 wherein the utilization device comprises at least one similar data rate multiplexer.

6. The combination in accordance with claim 1 including a decoder comprising a serial to parallel converter, means applying high speed data in serial to said converter, and means applying low speed frame and clock pulses to said converter to discharge data in parallel to low speed utilization devices at the low speed frame rate.

7. The combination in accordance with claim 1 including a decoder adapted to be connected to a plurality of low speed data utilization devices, said decoder comprising a serial to parallel converter including input terminals for serial input of high speed data and high speed clock pulses to advance data within the serial to parallel converter, means for applying low speed clock and frame pulses to said serial to parallel converter to read out low speed data in a plurality of channels.

8. The combination in accordance with claim 1 wherein a plurality of similar multiplexers are connected to respective output terminals of the serial to parallel converter and including means applying low speed frame and clock pulses from said multiplexer to said plurality of similar multiplexers.

9. A data rate changer comprising:

a storage memory;

a read address counter;

means for introducing data into said memory at an incoming frame rate;

means for generating a read drive signal from the incoming data rate;

said last means comprising;

a phase locked loop circuit including a mixer, a low pass filter and a voltage controlled oscillator connected in loop configuration;

means applying a clock signal derived from incoming data to the mixer of said phase locked loop circuit;

means for dividing the output of the voltage controlled oscillator by an integer *P;* means for applying the divided output of the voltage controlled oscillator to the mixer;

means dividing the output of the voltage controlled oscillator by a factor *Q;* and means for applying said last output to the read address counter as the read signal to the memory.

10. A data multiplexer including a high speed input terminal, and a high and low speed output terminal for serial connection in a data transmission system including a source of high speed serial data comprising:

a multistage counter for counting at least one frame of high speed clock pulse;

buffer storage means for storing incoming high speed data a pair of data select logic means each under the control of said counter, one of said data selected logic means being operative to connect the high speed data input terminal of said multiplexer to the high speed data output terminal of said multiplexer to pass high speed serial data through said multiplexer; the second of said data select logic means being connected to said high speed data input terminal of said multiplexer and to said buffer storage means for selectively introducing high speed serial data into said buffer storage means;

means responsive to incoming frame and clock pulses for producing low speed frame and clock pulses;

means applying said low speed frame and clock pulses to said buffer storage means to discharge data in said storage means at low speed through said low speed data terminal of said multiplexer.

* * * * *